United States Patent
Yoon et al.

(10) Patent No.: US 9,252,448 B2
(45) Date of Patent: Feb. 2, 2016

(54) CERIA-BASED COMPOSITION INCLUDING BISMUTH OXIDE, CERIA-BASED COMPOSITE ELECTROLYTE POWDER INCLUDING BISMUTH OXIDE, METHOD FOR SINTERING THE SAME AND SINTERED BODY MADE THEREOF

(71) Applicant: KOREA INSTITUTE OF SCIENCE AND TECHNOLOGY, Seoul (KR)

(72) Inventors: Sung Pil Yoon, Gyeonggi-do (KR); Jonghee Han, Seoul (KR); Shin Ae Song, Seoul (KR); Tae Hoon Lim, Seoul (KR); Hyoung-Juhn Kim, Gyeonggi-do (KR); Jong Hyun Jang, Seoul (KR); Dirk Henkensmeier, Seoul (KR); Eun Ae Cho, Seoul (KR); Suk Woo Nam, Seoul (KR); Seong Ahn Hong, Seoul (KR); Thieu Cam-Anh, Ho Chi Minh (VN)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 116 days.

(21) Appl. No.: 13/929,954

(22) Filed: Jun. 28, 2013

(65) Prior Publication Data

US 2014/0004446 A1  Jan. 2, 2014

(30) Foreign Application Priority Data

Jun. 29, 2012 (KR) .................. 10-2012-0071376

(51) Int. Cl.
*H01M 8/12* (2006.01)
*C04B 35/50* (2006.01)
*C04B 35/626* (2006.01)

(52) U.S. Cl.
CPC .............. *H01M 8/126* (2013.01); *C04B 35/50* (2013.01); *C04B 35/62675* (2013.01);

(Continued)

(58) Field of Classification Search
None
See application file for complete search history.

(56) References Cited

U.S. PATENT DOCUMENTS

2003/0027033 A1   2/2003   Seabaugh et al.
2009/0087697 A1   4/2009   Ramanathan et al.

FOREIGN PATENT DOCUMENTS

EP    1 026 123 A2    8/2000
JP    2000-070706 A   3/2000

(Continued)

OTHER PUBLICATIONS

Seung-Seok Baek, et al; "Addition effects of erbia-stabilized bismuth oxide on ceria-based carbonate composite electrolytes for intermediate temperature—solid oxide fuel cells", Internationa Journal of Hydrogen Energy, vol. 37, pp. 16823-16834; Available online Sep. 23, 2012.

(Continued)

*Primary Examiner* — Patrick Ryan
*Assistant Examiner* — Wyatt McConnell
(74) *Attorney, Agent, or Firm* — Ladas & Parry LLP

(57) ABSTRACT

Provided are a ceria-based composition having an undoped or metal-doped ceria and an undoped or metal-doped bismuth oxide, wherein the undoped or metal-doped bismuth oxide is present in an amount equal to or more than about 10 wt % and less than about 50 wt % based on the total weight of the ceria-based composition, and at least one selected from the ceria and the bismuth oxide is metal-doped. The ceria-based composition may ensure high sintering density even at a temperature significantly lower than the known sintering temperature of about 1400° C., i.e., for example at a temperature of about 1000° C. or lower, and increase ion conductivity as well.

14 Claims, 16 Drawing Sheets

(52) U.S. Cl.
CPC ...... *C04B 35/62685* (2013.01); *H01M 8/1266* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/3298* (2013.01); *C04B 2235/77* (2013.01); *C04B 2235/85* (2013.01); *H01M 2300/0074* (2013.01); *H01M 2300/0091* (2013.01); *Y02E 60/521* (2013.01); *Y02E 60/525* (2013.01)

(56) References Cited

FOREIGN PATENT DOCUMENTS

| | | |
|---|---|---|
| JP | 2005-534152 A | 11/2005 |
| JP | 2008-153213 A | 7/2008 |
| KR | 1020100041348 A | 4/2010 |

OTHER PUBLICATIONS

Yongli Yao, et al; "Study on Multi-doped ceria-based solid electrolytes", Key Engineering Materials, vol. 519, pp. 28-31; Jul. 2012.

Xinge Zhang, et al; "A study on sintering aids for $Sm_{0.2}Ce_{0.8}O_{1.9}$ electrolyte", Journal of Power Sources, vol. 162, pp. 480-485; Available online Aug. 22, 2006.

Vanesa Gil, et al; "Low-temperature densification and grain growth of $Bi_2O_3$-doped-ceria gadolinia ceramics", Solid State Ionics, vol. 178, pp. 359-365; Mar. 2007.

Japanese Office Action dated Jul. 1, 2014; Appln. No. 2013-135850.

Vanesa Gil, et al; "Low-temperature densification and grain growth of $Bi_2O_3$-doped-ceria gadolinia ceramics", Solid State Ionics vol. 178, Issues 5-6, pp. 359-365; Mar. 2007.

Qingshan Zhu, et al; "Low temperature sintering of 8YSZ electrolyte film for intermediate temperature solid oxide fuel cells", Solid State Ionics, vol. 176, Issues 9-10, Mar. 15, 2005.

Xinge Zhang, et al; "A study on sintering aids for $Sm_{o.2}Ce_{0.8}O_{1.9}$ electrolyte", Journal of Power Sources, vol. 162, pp. 480-485; Available online Aug. 22, 2006.

Ta-Jen Huang, et al; "Effect of $Bi_2O_3$ content on characteristics of $Bi_2O_3$-GDC systems for direct methane oxidation", Journal of Power Sources, vol. 181, pp. 62-68; Available online Mar. 25, 2008.

Jun-Young Park, et al; "Stable and high conductivity ceria/bismuth oxide bilayer electrolytes for lower temperature solid oxide fuel cells", Ionics, vol. 12, pp. 15-20; Published online Apr. 25, 2006.

CERIA-BASED COMPOSITION INCLUDING BISMUTH OXIDE, CERIA-BASED COMPOSITE ELECTROLYTE POWDER INCLUDING BISMUTH OXIDE, METHOD FOR SINTERING THE SAME AND SINTERED BODY MADE THEREOF

CROSS-REFERENCE TO RELATED APPLICATION

This application claims priority to Korean Patent Application No. 10-2012-0071376, filed on Jun. 29, 2012, and all the benefits accruing therefrom under 35 U.S.C. §119, the contents of which in its entirety are herein incorporated by reference.

BACKGROUND

1. Field

The present disclosure relates to a ceria-based composition including bismuth oxide, a ceria-based composite electrolyte powder including bismuth oxide, a method for sintering the ceria-based composition or the ceria-based composited electrolyte powder, and a sintered body of the ceria-based composition or the ceria-based composited electrolyte powder.

2. Description of the Related Art

Electrolyte for use in sensors or fuel cells, etc., is an ion conductor through which ions generated at one electrode move toward the other electrode. Therefore, it is required for the electrolyte to have high ion conductivity and have no electron conductivity. In addition, when used in fuel cells, electrolyte is required to be so dense that a so-called crossover phenomenon, in which anode gas is mixed with cathode gas, may be prevented, and to be stable structurally and chemically at high temperature and under both oxidative atmosphere and reductive atmosphere.

As for a material satisfying the above-described requirements relatively well, there is yttria-stabilized zirconia (YSZ). Yttria stabilized zirconia has an excellent mechanical strength and shows a stability and a reproducibility as an electrolyte of solid oxide fuel cells, etc., and thus is most widely used now.

However, manufacturing sensors or solid oxide fuel cells, etc. using yttria-stabilized zirconia electrolyte in large scale is difficult and requires high cost due to a high sintering temperature of about 1400° C. or higher.

Meanwhile, recently, studies have been conducted on electrolyte materials having high oxygen ion conductivity to provide high-performance solid oxide fuel cells. For example, studies have been conducted on bismuth oxide ($Bi_2O_3$), perovskite structured compounds such as lanthanum gallate ($LaGaO_3$) or barium cerate ($BaCeO_3$), ceria ($CeO_2$), etc.

Particularly, among them, ceria has significantly high ion conductivity and relatively excellent mechanical properties, and thus is given many attentions as a prominent alternative electrolyte.

However, sintering ceria-based electrolytes is difficult and thus requires a higher sintering temperature (at least about 1500° C.) as compared to the known yttria-stabilized zirconia electrolyte. Moreover, ceria may be provided with electron conductivity when $Ce^{4+}$ is reduced into $Ce^{3+}$ under reductive atmosphere at an anode side, thereby causing a short circuit between a cathode and an anode. This makes it difficult to commercialize the ceria-based electrolyte.

Low-temperature sintering methods applicable to such electrolyte may include chemical vapor deposition (CVD), electrochemical vapor deposition (EVD), plasma sputtering, electrophoretic deposition (EPD), or the like. However, these methods require expensive equipments or processes, and thus are not suitable for scaling-up and cost saving.

Q. Zhu et al. discloses very fine particles with a size of about 9 nm obtained by using a hydrothermal process to reduce the sintering temperature of yttria-stabilized zirconia (Solid State Ionics 176, 889-894, 2005). Since a decrease in particle size results in an increase in surface energy, sintering of particles may be carried out at a temperature much lower than the conventional sintering temperature of bulk particles. However, the present inventors note that the above-mentioned method requires high cost to reduce the size of particles into several nanometers, which results in an increases of total manufacturing cost.

Zhang et al. discloses that incorporation of about 1% copper oxide or cobalt oxide to samarium-doped ceria may reduce a sintering temperature from about 1400° C. or more to near about 1000° C. (Journal of Power Sources, 162, 480-485, 2006). However, the present inventors note that the above-mentioned method still does not allow the sintering temperature to be reduced to about 1000° C. or lower. In addition, it is noted that even if a sintering aid agent (e.g. $Co_3O_4$, CuO, $MnO_3$, etc.) is used in Zhang et al. to reduce the sintering temperature of ion conductive materials such as ceria, the sintering aid agent itself may serve as impurities so that it rather causes a degradation of the ion conductivity of the ion conductive material.

SUMMARY

The present disclosure is directed to providing a ceria-based composition, which may reduce sintering temperature to allow sintering at a low temperature of about 1400° C. or lower, for example, about 1000° C. or lower, enable sintering with high densification and scaling-up to a large area even at such low-temperature sintering, avoid a decrease in ion conductivity, and cause bismuth oxide, which is an ion conductor, to be formed at ceria grain boundaries, thereby inhibiting electron conductivity of ceria. The present disclosure is further directed to providing ceria-based composite electrolyte powder, and a sintering method and a sintered body.

According to embodiments, provided is a ceria-based composition, comprising a ceria and a bismuth oxide, wherein the bismuth oxide is present in an amount equal to or more than about 10 wt % and less than about 50 wt % based on the total weight of the ceria-based composition, and at least one selected from the ceria and the bismuth oxide is metal-doped.

According to embodiments, provided is a sintered body of a composition comprising a ceria and a bismuth oxide, wherein the bismuth oxide is present in an amount equal to or more than about 10 wt % and less than about 50 wt % based on the total weight of the ceria-based composition, and at least one selected from the ceria and the bismuth oxide is metal-doped.

According to embodiments, the sintered body may comprise ceria grains and bismuth oxides existing at grain boundaries surrounding the ceria grains, wherein doping metals are present both in the grains and grain boundaries.

According to embodiments, provided is a ceria-based composite electrolyte powder obtained by calcination of a ceria-based composition comprising a ceria and a bismuth oxide, wherein the bismuth oxide is present in an amount equal to or more than about 10 wt % and less than about 50 wt % based on the total weight of the ceria-based composition, and at least one selected from the ceria and the bismuth oxide is metal-doped.

According to embodiments, provided is a sintered body of a ceria-based composite electrolyte powder obtained by calcination of a ceria-based composition comprising a ceria and a bismuth oxide, wherein the bismuth oxide is present in an amount equal to or more than about 10 wt % and less than about 50 wt % based on the total weight of the composition, and at least one selected from the ceria and the bismuth oxide is metal-doped.

According to embodiments, the sintered body may comprise ceria grains and bismuth oxides existing at grain boundaries surrounding the ceria grains, wherein doping metals are present both in the grains and grain boundaries.

According to embodiments, provided is a sintering method, comprising: carrying out calcination of a ceria-based composition comprising a ceria and a bismuth oxide, wherein the bismuth oxide is present in an amount equal to or more than about 10 wt % and less than about 50 wt % based on the total weight of the ceria-based composition, and at least one selected from the ceria and the bismuth oxide is metal-doped, to provide a powder, and then sintering the powder; or sintering the ceria-based composition.

According to some embodiments, the composition may include metal-doped ceria; and bismuth oxide.

According to some embodiments, the composition may include ceria; and metal-doped bismuth oxide.

According to some embodiments, the composition may include metal-doped ceria; and metal-doped bismuth oxide.

According to some embodiments, the bismuth oxide may be present in an amount of about 10 wt % to about 30 wt % based on the total weight of the ceria-based composition.

According to some embodiments, the bismuth oxide may be particularly present in an amount more than about 15 wt % and equal to or less than about 25 wt %, more particularly in an amount of about 20 wt % to about 25 wt % based on the total weight of the ceria-based composition.

According to some embodiment, a metal of the metal-doped ceria may be samarium (Sm), gadolinium (Gd), lanthanum (La), zirconium (Zr), yttrium (Y), ytterbium (Yb), erbium (Er), praseodymium (Pr) or neodymium (Nd).

According to some embodiments, the composite electrolyte powder or the ceria-based composition may be charged to a fuel cell without sintering, and then be sintered during an operation of the fuel cell.

According to some embodiments, the composite electrolyte powder may be subjected to ball milling prior to sintering.

According to some embodiments, the sintered body may be sintered at a temperature of about 800° C. to about 1000° C.

According to some embodiments, the sintered body may be sintered for at least about 30 minutes.

According to embodiments, provided is an electrolyte sintered by the above-mentioned sintering method.

According to embodiments, provided is a ceria-based electrolyte comprising ceria grains and bismuth oxides existing at grain boundaries surrounding the ceria grains, wherein doping metals are present both in the grains and grain boundaries.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 2a is the SEM image of the surface and FIG. 2b is the SEM image of a fracture surface;

DETAILED DESCRIPTION

Figure 1:
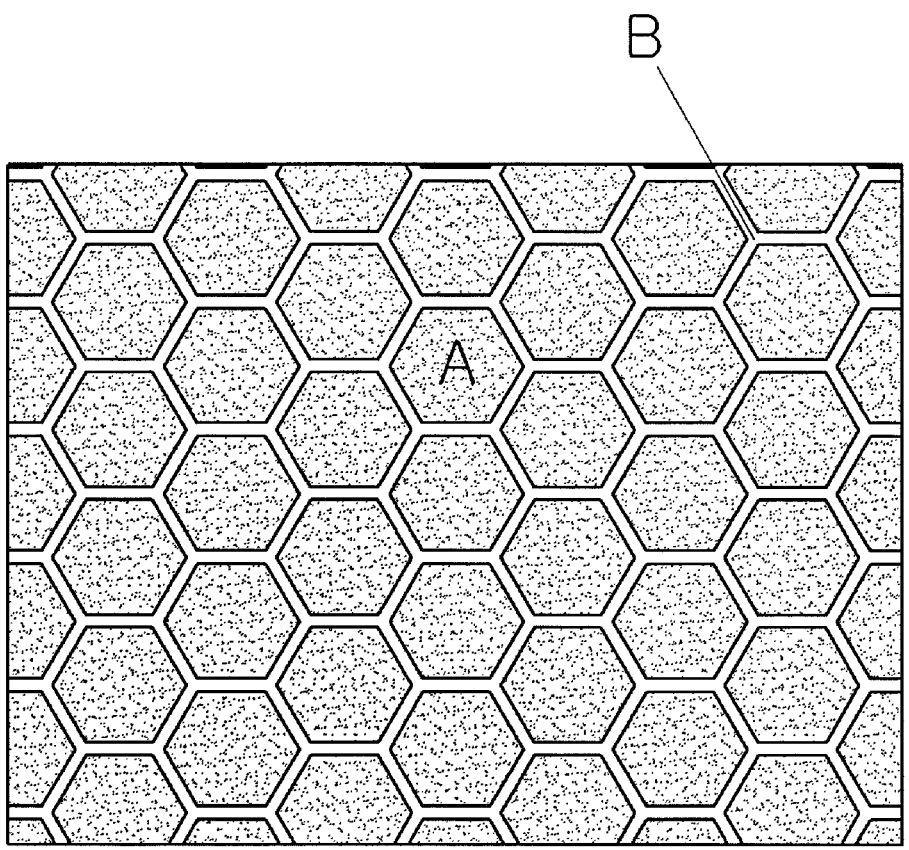
FIG. 1 is a schematic view illustrating the grains and grain boundaries of the ceria-based electrolyte according to embodiments.

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose exemplary embodiments.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

A low-temperature sintering method, for example, an in-situ sintering method in fuel cells (i.e., a method of co-sintering electrolyte in a range of fuel cell operation temperatures) may be most suitable manufacturing method of a ceria-based material, particularly a ceria-based electrolyte requiring high sintering temperature so as to realize its scaling-up to large area and manufacturing cost reduction. The present inventors has studied intensively on the low-temperature sintering method such as the in-situ sintering to allow sintering with high densification and scaling-up to a large area even at the low temperature sintering.

The embodiments of the present disclosure relate to a ceria-based composition including bismuth oxide which may allow a ceria-based electrolyte, for example, a ceria-based electrolyte used for high temperature sensors or solid oxide fuel cells, etc. to be sintered with high density even at a low temperature of about 1000° C. or less, and cause bismuth oxide, which is an ion conductor, to be formed at ceria grain boundaries so as to inhibit electron conductivity of ceria. The embodiments of the present disclosure also relate to a ceria-based composite electrolyte powder, and a sintering method and sintered body of the ceria-based composition and the ceria-based composite electrolyte powder.

In this context, the term 'ceria-based composition' means that the corresponding composition includes ceria in an amount of at least about 50 wt % based on the total weight of the composition.

In this context, the term 'ceria-based composite electrolyte powder' means that the corresponding powder is made using the ceria-based composition.

A low-temperature sintering method, such as in-situ sintering in a fuel cell (co-sintering of electrolyte in a range of operation temperatures of a fuel cell) may be the most suitable sintering method for ceria for the purpose of scaling-up and cost saving.

However, in the case of the in-situ sintering, it may be required that sintering temperature for each component of a fuel cell, i.e., an anode, electrolyte or a cathode is set within a temperature range in which a separator material resists. Thus, a significantly low co-sintering temperature may be required. For example, when a conventional metal material is used as a separator, sintering may be required to be carried out at about 800° C. or lower for about 2 hours or less. When an Inconel-series (i.e., austenitic nickel-chromium-based alloys) high-temperature metal material is used as a separator, sintering may be required to be carried out at about 1000° C. or lower for about 2 hours or less.

The embodiments of the present disclosure are directed to a ceria-based composition, which may enable high densification and scaling-up to a large area even at a low sintering temperature, while not causing degradation of ion conductivity but rather enhancing ion conductivity.

In non-limiting embodiments, provided is a ceria-based composition including a ceria and a bismuth oxide, wherein the bismuth oxide is present in an amount of about 10 wt % to about 50 wt % based on the total weight of the composition, and at least one selected from ceria and bismuth oxide is metal-doped. Further, in non-limiting embodiments, provided are a sintered body of the ceria-based composition, a ceria-based composite electrolyte powder obtained by calcination of the ceria-based composition, a sintered body of the composition or the ceria-based composite electrolyte powder, and a sintering method.

That is, bismuth oxide (melting point: about 890° C.) is added to ceria as a sintering aid agent in an amount of about 10 wt % to about 50 wt % to reduce the sintering temperature of ceria, followed by sintering or calcination and sintering. Herein, ceria and/or bismuth oxide, particularly ceria is metal-doped to reduce the sintering temperature to a low temperature of about 1400° C. or lower, particularly, about 1000° C. or lower as well as to obtain a dense sintered body and to increase the ion conductivity of the resultant composite electrolyte including ceria and bismuth oxide (for example, by about 1.5 times). Since the sintering temperature of about 1000° C. or lower is a temperature capable of co-firing, such lowering in temperature may be advantageous and significant in many viewpoints.

The above phenomenon in the embodiments is rather opposite to the conventional observations that use of a sintering aid agent causes degradation of performance of electrolyte (see the related art) because the sintering aid agent serves as impurities.

It is believed that such an increase in ion conductivity in the embodiments results from the fact that the doping metal moves upon sintering in such a manner that the doping metal is present both in ceria and bismuth oxide.

FIG. 1 is a schematic view illustrating the grains and grain boundaries of the ceria-based electrolyte according to embodiments.

As shown in FIG. 1, bismuth oxide exists at grain boundaries B surrounding ceria grains A that exist repeatedly, and the grain boundaries are connected with each other so that the grains are surrounded with the grain boundaries. Parts of the doping metal, with which ceria and/or bismuth oxide is doped, may move during a sintering process, and to this end, the doping metal is present both in ceria grains and bismuth oxide grain boundaries.

For example, when using a composition including metal-doped ceria in combination with bismuth oxide, it is believed that parts of the metal which is doped to ceria may move toward bismuth oxide during a sintering process, thereby stabilizing the bismuth oxide phase as a δ phase, resulting in rather an increase in ion conductivity.

Meanwhile, mixing metal-doped bismuth oxide with ceria or metal-doped ceria may improve the ion conductivity. However, in this case, the melting point may increase, thereby limiting the effect of reducing the sintering temperature of ceria. In light of this, it may be advantageous that ceria is doped with a metal and then bismuth oxide is mixed with the metal-doped ceria in order for the doping metal to move toward the bismuth oxide.

According to an embodiment, bismuth oxide may be present in an amount of about 10 wt % to about 30 wt % based on the total weight of the ceria-based composition.

According to an embodiment, bismuth oxide may be present in an amount of about 10 wt % to about 30 wt %, particularly more than about 15 wt % and equal to or less than about 25 wt %, and more particularly about 20 wt % to about 25 wt % based on the total weight of the ceria-based composition in order to obtain high sintering density even at low temperature.

That is, in order to obtain a desired sintering density (about 94% or more) at about 1000° C. or lower, bismuth oxide may be used in an amount of about 10 wt % to about 30 wt %, particularly more than about 15 wt % and equal to or less than about 25 wt %, and more particularly about 20 wt % to about 25 wt %.

When bismuth oxide is used in an amount of about 10 wt % or more, sintering density may significantly increase upon sintering even at a low temperature of about 1000° C. or lower. When bismuth oxide is used in an amount more than about 15 wt %, sintering density may further increase and reach the highest density at about 20 wt % or more. Then, the composition may show a sintering density similar to the sintering density at about 20 wt % until the amount of bismuth oxide reaches about 25 wt % (see FIG. 4).

Meanwhile, when bismuth oxide is used in an amount more than about 30 wt %, the resultant molded body may possibly be broken due to liquid phase flow during molding, or a sweating (condensation phenomenon of a liquid phase discharged from a sample) may occur, thereby resulting in degradation of physical properties and quality of molded ceria or metal-doped ceria.

There is no particular limitation in metal-doped ceria. As for non-limiting examples, doping metals may include samarium (Sm), gadolinium (Gd), lanthanum (La), zirconium (Zr), yttrium (Y), ytterbium (Yb), erbium (Er), praseodymium (Pr) or neodymium (Nd).

In a non-limiting example embodiment, the ceria-based composition may be calcined (e.g. at about 300° C. to about 800° C.) to provide powder, which, in turn, is sintered. However, the ceria-based composition may be sintered directly without calcination. The sintered bodies obtained accordingly may be useful as electrolyte.

In a non-limiting example embodiment, ceria or metal-doped ceria may be mixed with bismuth oxide, and then subjected to ball-milling (for example, dry ball-milling) to provide a composite powder.

Meanwhile, in a non-limiting embodiment, the ceria-based composition or ceria-based composite electrolyte powder may be charged to a solid oxide fuel cell, etc. without sintering, and then subjected to a low-temperature in-situ sintering, for example, at a temperature of about 1200° C. or lower, particularly at a temperature of about 800° C. to about 1000° C. during the operation of the fuel cell. As for a non-limiting example, the sintering may be performed for about 30 minutes or more. As the sintering time increases, sintering density may decrease slightly but sintering may be carried out better.

In a non-limiting example embodiment, even when the composition or powder is subjected to such low-temperature sintering, it is possible to ensure a sintering density of about 94% or higher.

The examples and experiments will now be described. The following examples and experiments are for illustrative purposes only and not intended to limit the scope of the present invention.

Samarium-doped ceria (SDC) powder ($Sm_{0.2}Ce_{0.8}O_2$, available from Praxair Co., USA) as metal-doped ceria is mixed with bismuth oxide ($Bi_2O_3$, available from Praxair Co., USA) to provide respective compositions for the following examples and comparative example. Then, the compositions are mixed by dry ball-milling for about 2 hours, and subjected to calcination at about 700° C. for about 3 hours to obtain the composites of the following examples and comparative examples.

Comparative Example 1 is a samarium-doped ceria powder alone.

Comparative Example 2 is a composite electrolyte powder where samarium-doped ceria is mixed with bismuth oxide (bismuth oxide content: about 1 wt % based on the total weight of the composition).

Comparative Example 3 is a composite electrolyte powder where samarium-doped ceria is mixed with bismuth oxide (bismuth oxide content: about 5 wt % based on the total weight of the composition).

Example 3 is a composite electrolyte powder where samarium-doped ceria is mixed with bismuth oxide (bismuth oxide content: about 10 wt % based on the total weight of the composition).

Example 4 is a composite electrolyte powder where samarium-doped ceria is mixed with bismuth oxide (bismuth oxide content: about 15 wt % based on the total weight of the composition).

Example 5 is a composite electrolyte powder where samarium-doped ceria is mixed with bismuth oxide (bismuth oxide content: about 20 wt % based on the total weight of the composition).

Example 6 is a composite electrolyte powder where samarium-doped ceria is mixed with bismuth oxide (bismuth oxide content: about 25 wt % based on the total weight of the composition).

One embodiment of the method of preparing a sintered body comprises mixing, molding, coating, layering and sintering. Mixing includes mixing together a ceria based composition with a bismuth oxide based composition to form a ceria-bismuth powder, wherein the bismuth oxide based composition is between about 10 wt % and about 50 wt % based on the total weight of the ceria-bismuth powder, wherein the ceria based composition and/or the bismuth oxide based composition comprises a metal dopant at a concentration between about 10 wt % and about 30 wt % with respect to either the ceria based composition and/or the bismuth oxide based composition, and wherein the metal dopant is selected from the group consisting of samarian, gadolinium, lanthanum, zirconium, yttrium, ytterbium, erbium, praseodymium, neodymium, and combinations thereof. Molding includes molding an anode powder into an anode support wherein the anode powder comprises a metal powder mixed with an amount of the ceria-bismuth powder. Coating includes coating the anode support with an electrolyte slurry made from the ceria-bismuth powder to coat the anode support with an electrolyte coat. Layering includes layering a cathode slurry onto the electrolyte coated on the anode support. Sintering includes sintering in-situ the anode support coated with the electrolyte coat and layered with the cathode slurry at temperatures between about 800° C. to about 1500° C. to form the sintered body. An optional calcining procedure is available in which it can be performed prior to molding the ceria-bismuth powder and be performed between about 300° C. to about 800° C. Mixing can be performed by any known mixing procedure such as dry ball-milling to provide the ceria-bismuth powder. The anode powder can comprise any anode powder in which the anode powder is preferred to comprise nickel powder mixed with the ceria based composition. The coating procedure of the electrolyte slurry onto the anode support can be any known coating procedure such as dip-coating the anode support with the electrolyte slurry followed by drying to form the electrolyte coat in which dip-coating and drying is performed at least five times. The cathode slurry can comprises any slurry such as lanthanum strontium cobalt ferrite (LSCF) slurry that comprises $La_{0.6}Sr_{0.4}Co_{0.2}Fe_{0.8}O_3$. Layering the cathode slurry on the electrolyte coat can be any layering procedure such as tape casting the cathode slurry onto the electrolyte coat on the anode support. The temperature of in-situ sintering is performed up to about 1500° C., in which a more preferred temperature is about sintering 1200° C., and an even more preferred sintering temperature is about 1000° C. The ceria based composition can comprises undoped $CeO_2$. When doped the ceria base composition can comprise $Sm_{0.2}Ce_{0.8}O_2$. The metal dopant in the ceria based composition can be at an amount equal to or more than about 10 wt % and less than about 30 wt % based on a total weight of the ceria based composition. The metal dopant can be selected from the group consisting of samarian, gadolinium, lanthanum, zirconium, yttrium, ytterbium, erbium, praseodymium, neodymium, and combinations thereof. The bismuth oxide based composition may simply comprises undoped $Bi_2O_3$. However, the bismuth oxide based composition may comprise $Bi_{0.775}Sm_{0.225}O_{1.5}$. The metal dopant in the bismuth oxide based composition may be in amount between about 10 wt % and about 30 wt % based on a total weight of the bismuth oxide based composition, in which the metal dopant is selected from the group consisting of samarian, gadolinium, lanthanum, zirconium, yttrium, ytterbium, erbium, praseodymium, neodymium, and combinations thereof.

Another embodiment of the method of preparing the sintered body comprises mixing and sintering. In this variant, mixing may be achieved by mixing together a ceria based composition with a bismuth oxide based composition to form a ceria-bismuth powder, wherein the bismuth oxide based composition is between about 10 wt % and about 50 wt % based on the total weight of the ceria-bismuth powder, wherein the ceria based composition and/or the bismuth oxide based composition comprises a metal dopant at a concentration between about 10 wt % and about 30 wt % with respect to either the ceria based composition and/or the bismuth oxide based composition, and wherein the metal dopant is selected from the group consisting of samarian, gadolinium, lanthanum, zirconium, yttrium, ytterbium, erbium, praseodymium, neodymium, and combinations thereof. Sintering may be achieved by sintering the mixed together ceria-bismuth powder at temperatures between about 800° C. to about 1500° C. (preferably 1000° C.) to form the sintered body. Calcining may be optional applied in which the ceria-bismuth powder is calcined prior to sintering at a temperature between about 300° C. to about 800° C.

Yet another embodiment of the method of preparing a sintered body comprises mixing and sintering. In this variant mixing is performed by mixing together a ceria based composition comprising $Sm_{0.2}Ce_{0.8}O_2$ with a bismuth oxide based composition comprising $Bi_2O_3$ to form a ceria-bismuth powder. In this variant sintering is performed by sintering the mixed together ceria-bismuth powder at temperatures between about 800° C. to about 1500° C. (preferably 1000° C.) to form the sintered body. Calcining may be optional applied in which the ceria-bismuth powder is calcined prior to sintering at a temperature between about 300° C. to about 800° C.

EXPERIMENT 1

Each of the powder of Comparative Example and powder of Example 5 (composite electrolyte powder including samarium-doped ceria mixed with bismuth oxide; bismuth oxide content: about 20 wt % based on the total weight of powder) is introduced into a bar-like mold with a size of about 1 cm×about 1 cm×about 3 cm, and subjected to uniaxial pressurized molding, followed by sintering, to provide a sample for measurement of electroconductivity and sintering density.

Figure 2A:
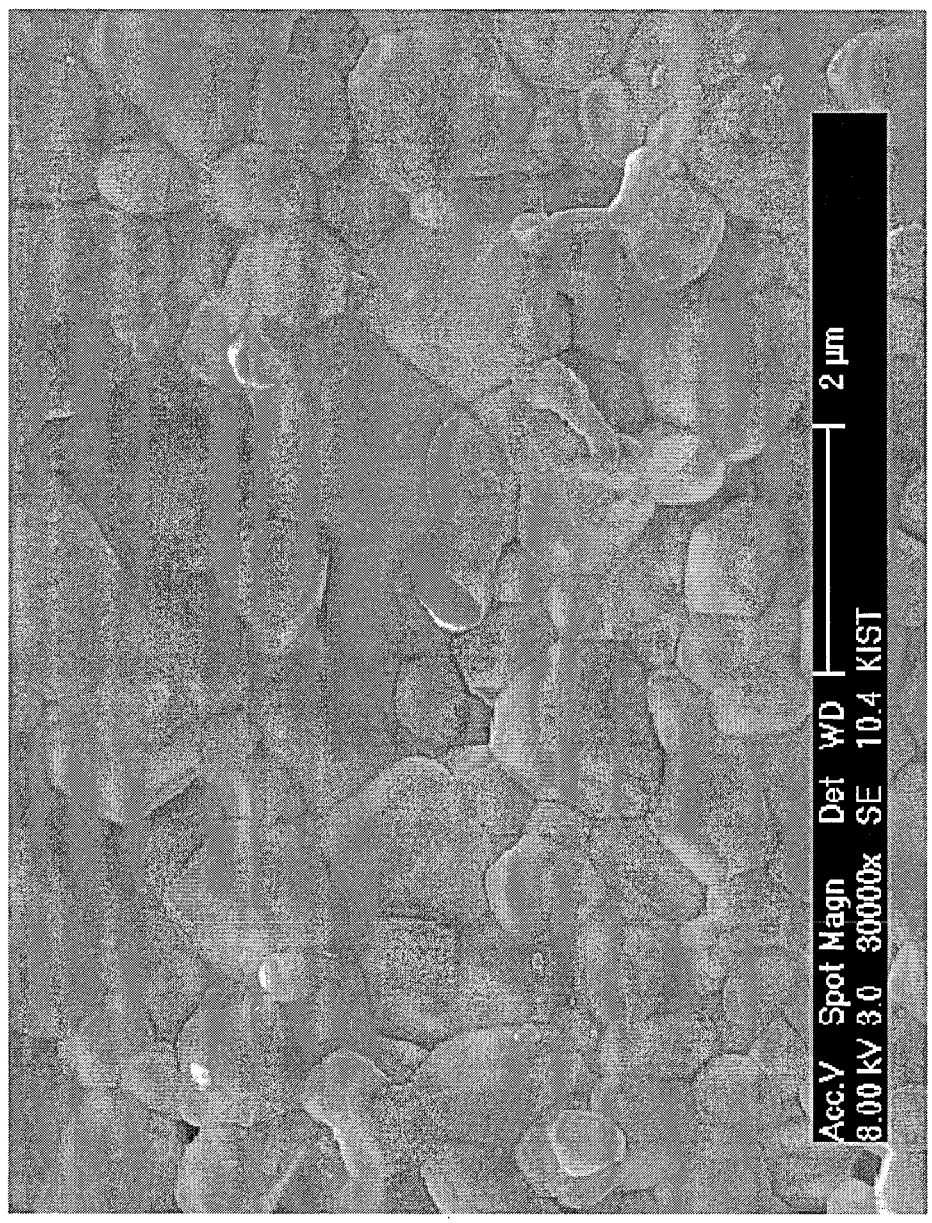
FIG. 2a and FIG. 2b are scanning electron microscopy (SEM) images of Example 5 (composite powder including samarium-doped ceria mixed with bismuth oxide; bismuth oxide content: about 20 wt % based on the total weight of the composite powder), after it is sintered at about 1000° C. for about 2 hours.
Figure 2B:
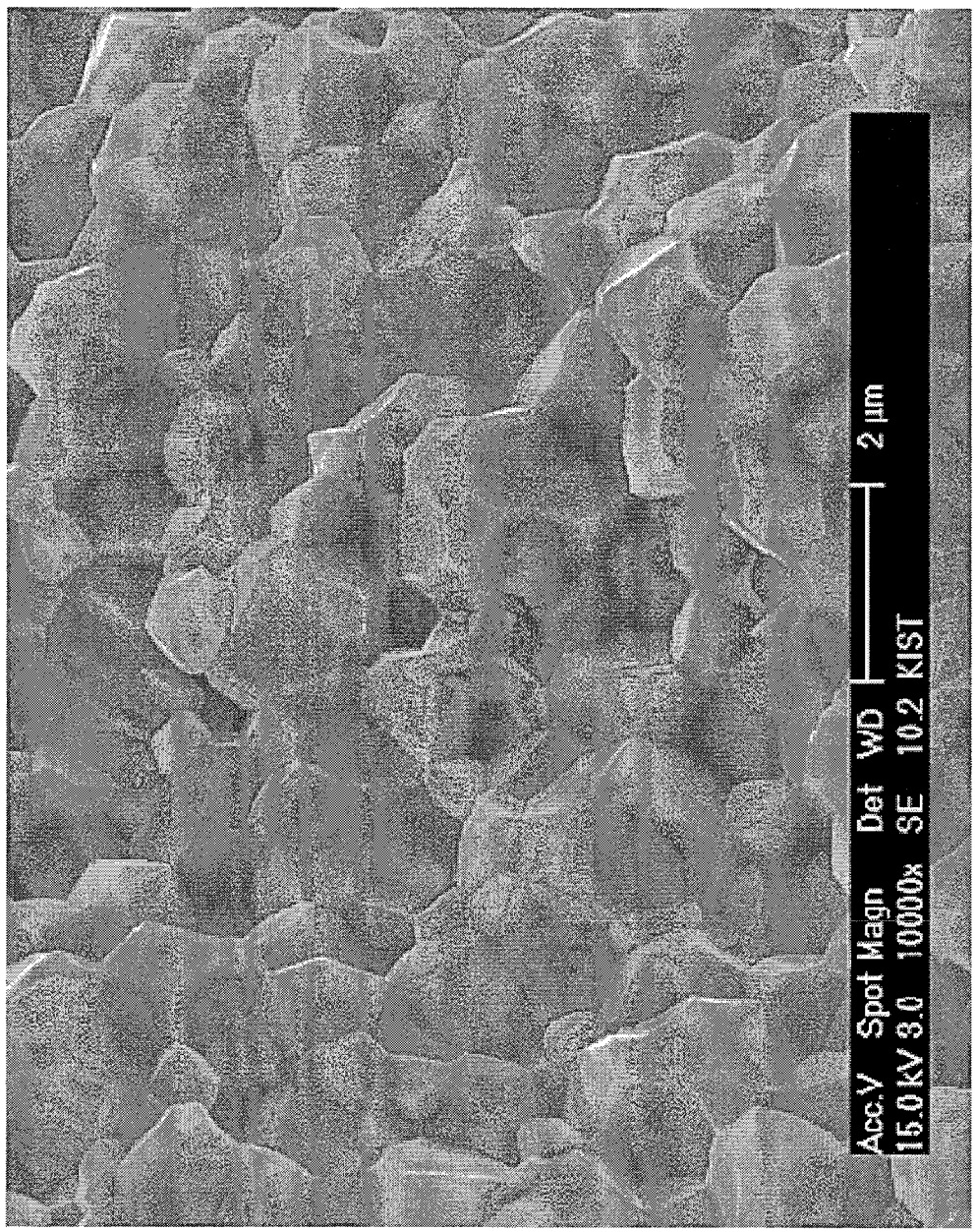
Figure 3:
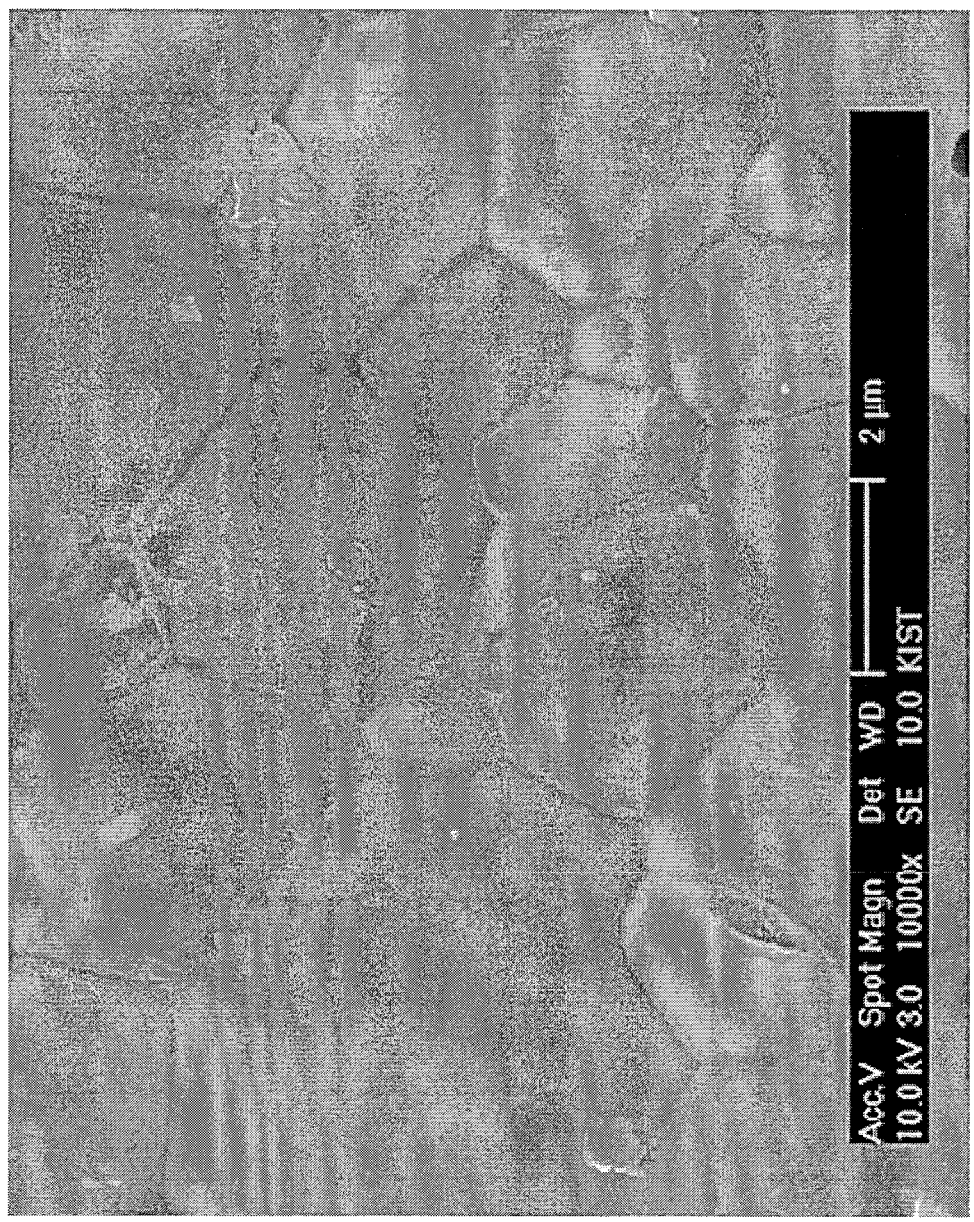
FIG. 3 is an SEM image of the surface of Comparative Example 1 where samarium-doped ceria alone is used and sintered at about 1500° C. for about 2 hours.

FIG. 2a and FIG. 2b are scanning electron microscopy (SEM) images of Example 5 (composite powder including samarium-doped ceria mixed with bismuth oxide; bismuth oxide content: about 20 wt % based on the total weight of powder), after it is sintered at 1000° C. for 2 hours, wherein FIG. 2a is the SEM image of the surface and FIG. 2b is the SEM image of a fracture surface. FIG. 3 is an SEM image of the surface of Comparative Example 1 using samarium-doped ceria alone, after it is sintered at about 1500° C. for about 2 hours.

As shown in FIG. 3, it can be seen from the surface image of the powder of Comparative Example 1 after it is sintered at about 1500° C. for about 2 hours that the powder is sintered to a certain degree but the sintering temperature is as high as about 1500° C. For reference, it is shown that the porosity measured by the Archimedes method is about 95% of the theoretical density.

By contrast, as can be seen from FIG. 2, Example 5 provides a very dense surface even at a low temperature of about 1000° C. after it is sintered at about 1000° C. for about 2 hours, and ensures a porosity of at least about 94% of the theoretical density.

EXPERIMENT 2

Each of Comparative Example 2 (composite powder including samarium-doped ceria mixed with bismuth oxide; bismuth oxide content: about 1 wt %); Comparative Example 3 (composite powder including samarium-doped ceria mixed with bismuth oxide; bismuth oxide content: about 5 wt %); Example 3 (composite powder including samarium-doped ceria mixed with bismuth oxide; bismuth oxide content: about 10 wt %); Example 4 (composite powder including samarium-doped ceria mixed with bismuth oxide; bismuth oxide content: about 15 wt %); Example 5 (composite powder including samarium-doped ceria mixed with bismuth oxide; bismuth oxide content: about 20 wt %); and Example 6 (composite powder including samarium-doped ceria mixed with bismuth oxide; bismuth oxide content: about 25 wt %) is subjected to ball milling to provide composite powder. Each composite powder is introduced into a bar-like mold with a size of about 1 cm×about 1 cm×about 3 cm, and subjected to uniaxial pressurized molding, followed by sintering at about 1000° C. for about 2 hours, to provide samples for measurement of electroconductivity and sintering density.

Figure 4:
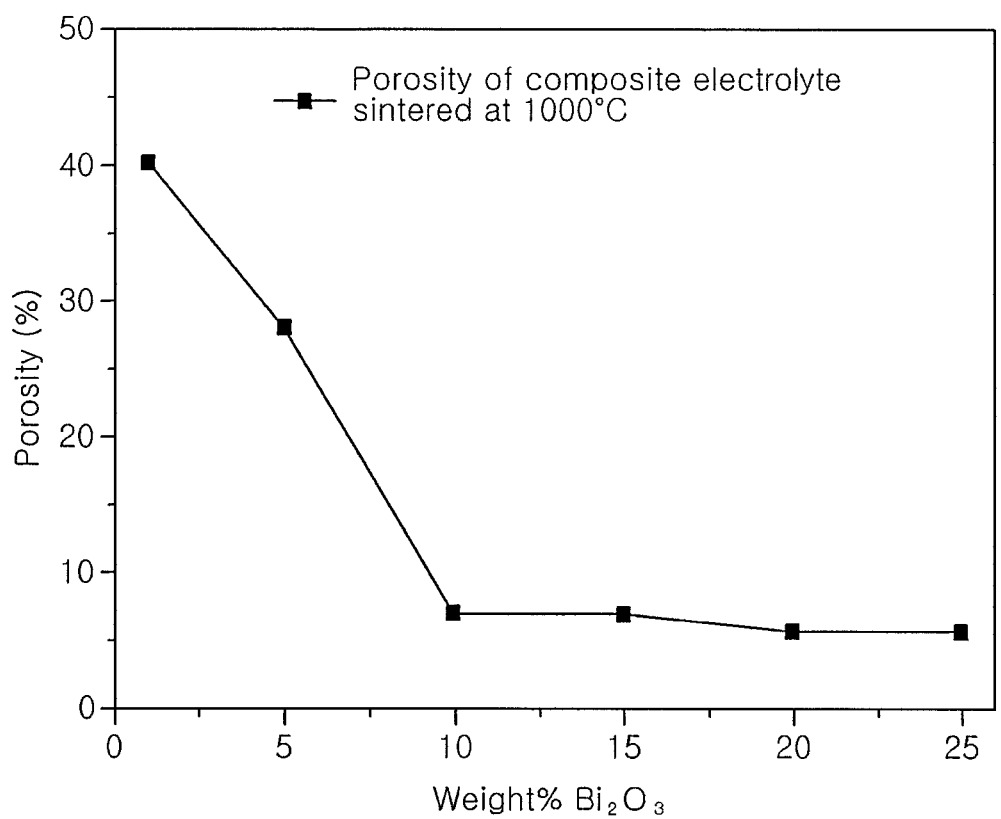
FIG. 4 is a graph illustrating variations in porosity of the sintered bodies depending on sintering temperature, where the sintered body are obtained by using samarium-doped ceria and a variable amount of bismuth oxide in Experiment 2. Herein, porosity corresponds to 100%—sintering density %.

FIG. 4 is a graph illustrating the sintering density of each powder according to Comparative Example 2, Comparative Example 3, Example 3, Example 4, Example 5 and Example 6, after it is sintered at about 1000° C. for about 2 hours. Herein, porosity corresponds to 100%—sintering density %. It can be seen from FIG. 4 that Example 3 (composite powder including samarium-doped ceria mixed with bismuth oxide; bismuth oxide content: about 10 wt %); Example 4 (composite powder including samarium-doped ceria mixed with bismuth oxide; bismuth oxide content: about 15 wt %); Example 5 (composite powder including samarium-doped ceria mixed with bismuth oxide; bismuth oxide content: about 20 wt %); and Example 6 (composite powder including samarium-doped ceria mixed with bismuth oxide; bismuth oxide content: about 25 wt %) provide a very dense electrolyte having a sintering density of about 93% or more (about 93% in the case of Example 3, about 93.1% in the case of Example 4, about 94.4% in the case of Example 5, and about 94.6% in the case of Example 6), even at a sintering temperature of about 1000° C., as compared to Comparative Examples 2 and 3. This demonstrates that Examples 3-6 enable sintering at a significantly lower temperature as opposed to the conventional sintering temperature of about 1500° C., and provide dense electrolyte as well.

That is, when adding bismuth oxide in an amount of about 10 wt % to about 50 wt %, particularly about 10 wt % to about 30 wt %, particularly more than about 15 wt % and equal to or less than about 25 wt %, and more particularly about 20 wt % to about 25 wt %, it is possible to obtain high density without degradation of physical properties, while reducing the sintering temperature from the conventional ceria sintering temperature of about 1500° C. to about 1000° C. or lower.

EXPERIMENT 3

Electroconductivity is measured for each sample obtained from the powder of Comparative Example 1 and powder of Example 5.

Figure 5:
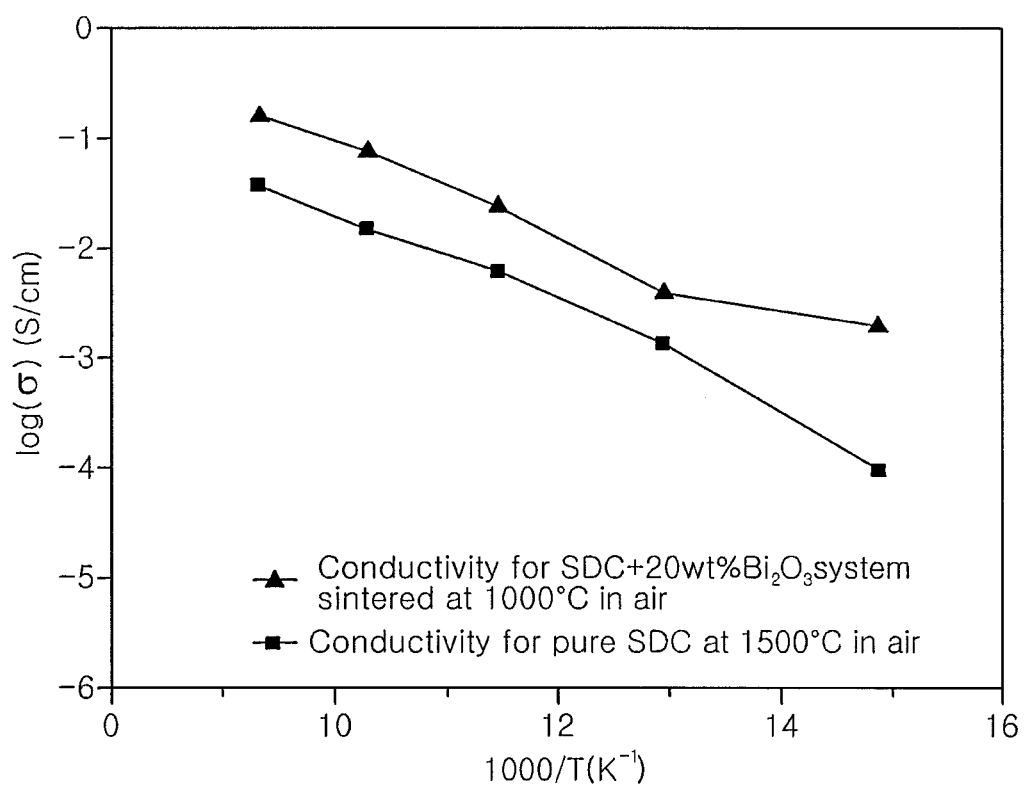
FIG. 5 is a graph illustrating the results of measurement of electroconductivity of the sintered body obtained by sintering the powder of Comparative Example 1 at about 1500° C. for about 2 hours (shown as '■' in the graph), and that of the sintered body obtained by sintering the powder of Example 5 (composite powder including samarium-doped ceria mixed with bismuth oxide; bismuth oxide content: about 20 wt % based on the total weight of the composite powder) at about 1500° C. for about 2 hours (shown as '▲' in the graph). Herein, X axis represents about 1000/temperature (unit: $K^{-1}$), and Y axis represents log of conductivity (unit: S/cm)

FIG. 5 is a graph illustrating the results of measurement of electroconductivity of the sintered body obtained by sintering the powder of Comparative Example 1 at about 1500° C. for about 2 hours (shown as '■' in the graph), and that of the sintered body obtained by sintering the powder of Example 5 (composite powder including samarium-doped ceria mixed with bismuth oxide; bismuth oxide content: about 20 wt % based on the total weight of powder) at about 1000° C. for about 2 hours (shown as '▲' in the graph), wherein X axis represents 1000/temperature (unit: $K^{-1}$), and Y axis represents log of conductivity (unit: S/cm)

As can be seen from FIG. 5, Example 5 provides a higher electroconductivity value as compared to Comparative Example 1 over the whole measurement temperature range (about 600 to about 1000° C.). The powder of Comparative Example 1 sintered at about 1500° C. is not densified, and thus provides a relatively low electroconductivity. By contrast, even when Example 5 is sintered at such a low temperature of about 1000° C., there is little loss of oxygen ion conductivity caused by low sintering density. Thus, it can be seen that Example 5 is suitable for an electrolyte applicable to in-situ sintering in a high-temperature fuel cell.

EXPERIMENT 4

Inco 255 nickel powder (Ni, available from Inco Company, USA) is mixed with samarium-doped ceria (SDC) in an amount of a SDC of about 20 wt % based on the total weight of powder to provide anode powder, which, in turn, is introduced to a disk-like mold having a diameter of about 2.54 cm and a thickness of about 1 mm, followed by uniaxial pressurized molding, thereby provide an anode support.

The anode support is dip-coated with slurry prepared from the powder of Example 5 and powder of Comparative Example 1 at least five times, followed by drying at room temperature, to form electrolyte.

Then, LSCF ($La_{0.6}Sr_{0.4}Co_{0.2}Fe_{0.8}O_3$, available from Praxair Co. USA) slurry is tape cast onto the sample dried at room temperature to provide an anode support type solid oxide fuel cell disk sample.

The sample is mounted to a system for measuring a unit cell performance and subjected to in-situ sintering at about 1000° C. for about 2 hours. After sintering, the temperature is reduced to about 600° C. to about 700° C. to measure the performance of the unit cell. The results are shown in FIG. 6a and FIG. 6b.

Figure 6A:
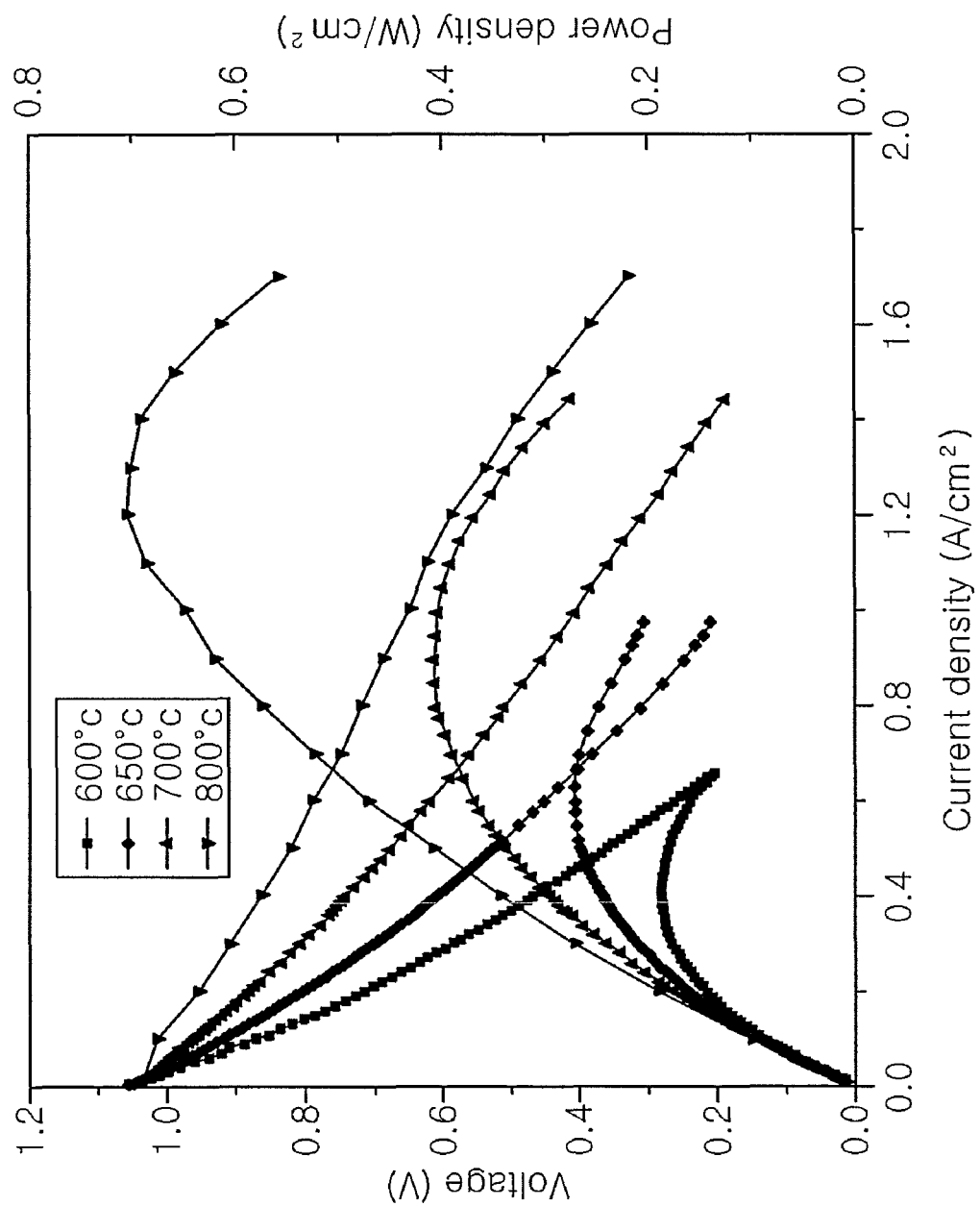
FIG. 6a and FIG. 6b are graphs illustrating the performance of the solid oxide fuel cell unit cells using the electrolytes obtained by sintering the powder of Example 5 (composite powder including samarium-doped ceria mixed with bismuth oxide; bismuth oxide content: about 20 wt % based on the total weight of the composite powder) (FIG. 6a) at about 1000° C. for about 2 hours and the electrolytes obtained by the powder of Comparative Example 1 (samarium-doped ceria alone) at about 1500° C. for about 2 hours (FIG. 6b), respectively. Herein, X-axis represents current density (unit: $A/cm^2$), the left side of Y-axis represents voltage (unit: V), and the right side of Y-axis represents power density (unit: $W/cm^2$); and hydrogen (about 200 mL/m) is used as fuel and oxygen (about 200 mL/m) is used as oxidant in the unit cells, and a performance is measured at an operation temperature of about 600° C., about 650° C., about 700° C. and about 800° C.
Figure 6B:
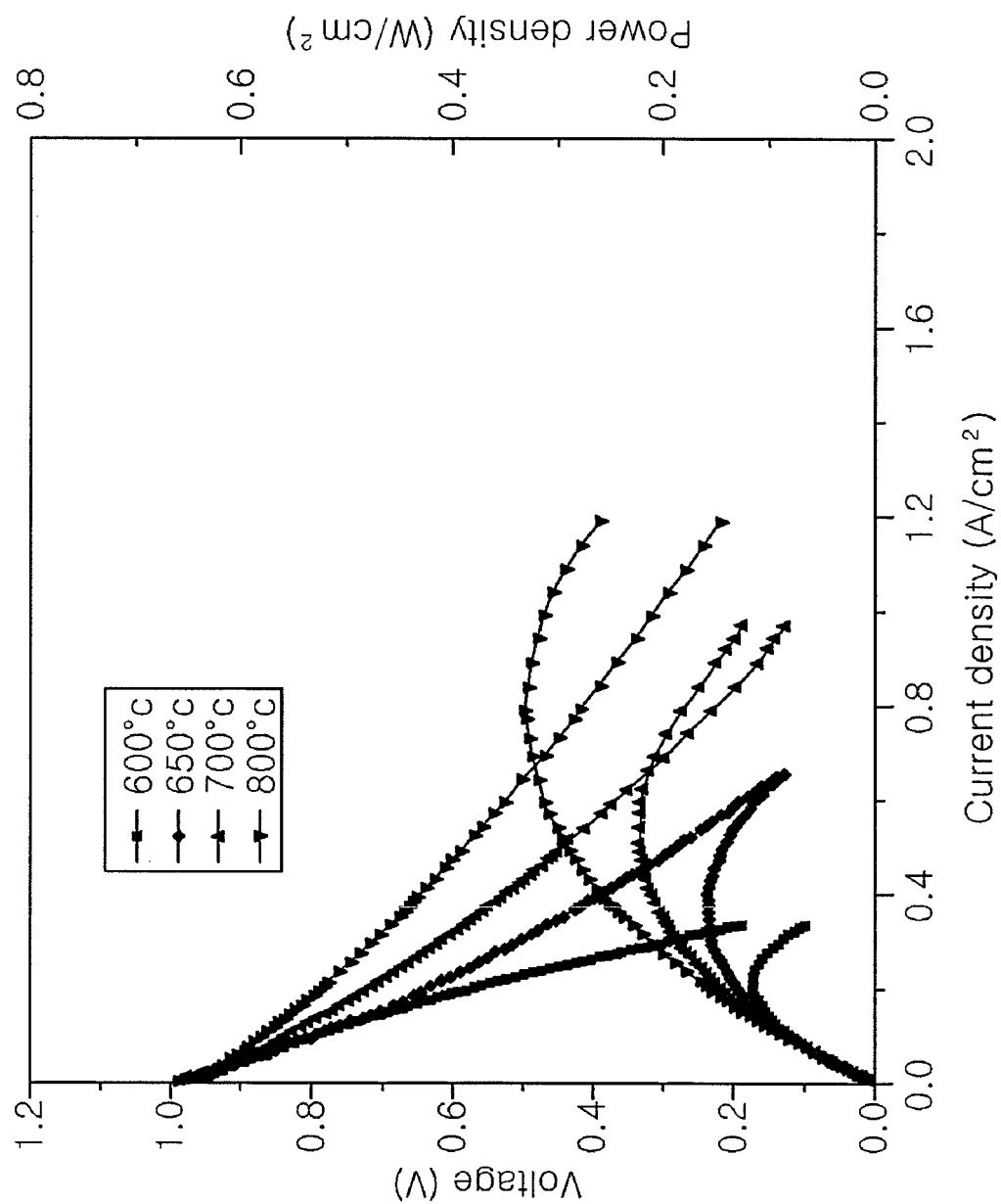

FIG. 6a and FIG. 6b are graphs illustrating the performance of the solid oxide fuel cell unit cells using the electrolytes obtained by sintering the powder of Example 5 (composite powder including samarium-doped ceria mixed with bismuth oxide; bismuth oxide content: about 20 wt % based on the total weight of powder) (FIG. 6a) at about 1000° C. for about 2 hours and the powder of Comparative Example 1 (samarium-doped ceria alone) at about 1500° C. for about 2 hours (FIG. 6b), respectively.

In FIG. 6a and FIG. 6b, X-axis represents current density (unit: A/cm$^2$), the left side of Y-axis represents voltage (unit: V), and the right side of Y-axis represents power density (unit: W/cm$^2$); and hydrogen (200 mL/m) is used as fuel and oxygen (200 mL/m) is used as oxidant in the unit cells, and the performance is measured at an operation temperature of about 600° C., about 650° C., about 700° C. and about 800° C.

As can be seen from FIG. 6, the unit cell of a solid oxide fuel cell obtained through the in-situ process at about 1000° C. provides the following power density: about 0.18 W/cm$^2$ at about 600° C.; about 0.27 W/cm$^2$ at about 650° C.; and about 0.41 W/cm$^2$ at about 700° C.

The unit cell shows an open-circuit voltage (OCV) similar to the theoretic value, suggesting that the electrolyte is sufficiently dense. This demonstrates that the unit cell may show performances similar to that of the unit cell of a solid oxide fuel cell using electrolyte obtained through the high-temperature multi-step sintering process according to the related art, thereby providing sufficient industrial applicability.

When using samarium-doped ceria of Comparative Example 1 as electrolyte, OCV appears at about 1.0V or less. By contrast, in the case of Example 5, OCV appears at about 1.0V or more. It is known that generally ceria-based electrolyte causes current leakage because ceria undergoes reduction from Ce$^{4+}$ into Ce$^{3+}$ under the reductive atmosphere of an anode and thereby has electroconductivity. However, Example 5 shows no such current leakage. It is believed that even though a part of Ce$^{4+}$ is reduced into Ce$^{3+}$ under the reductive atmosphere of an anode, bismuth oxide present at grain boundaries interrupts electroconductivity, and thus prevents current leakage. That is, in the case of Example 5 (the other Examples are same), it can be seen that samarium-doped ceria and bismuth oxide may be complementary to each other to provide a synergic effect so that they reduce the sintering temperature and enhance ion conductivity as well.

EXPERIMENT 5

In this Experiment, variations in sintering density depending on sintering time are studied.

Figure 7:
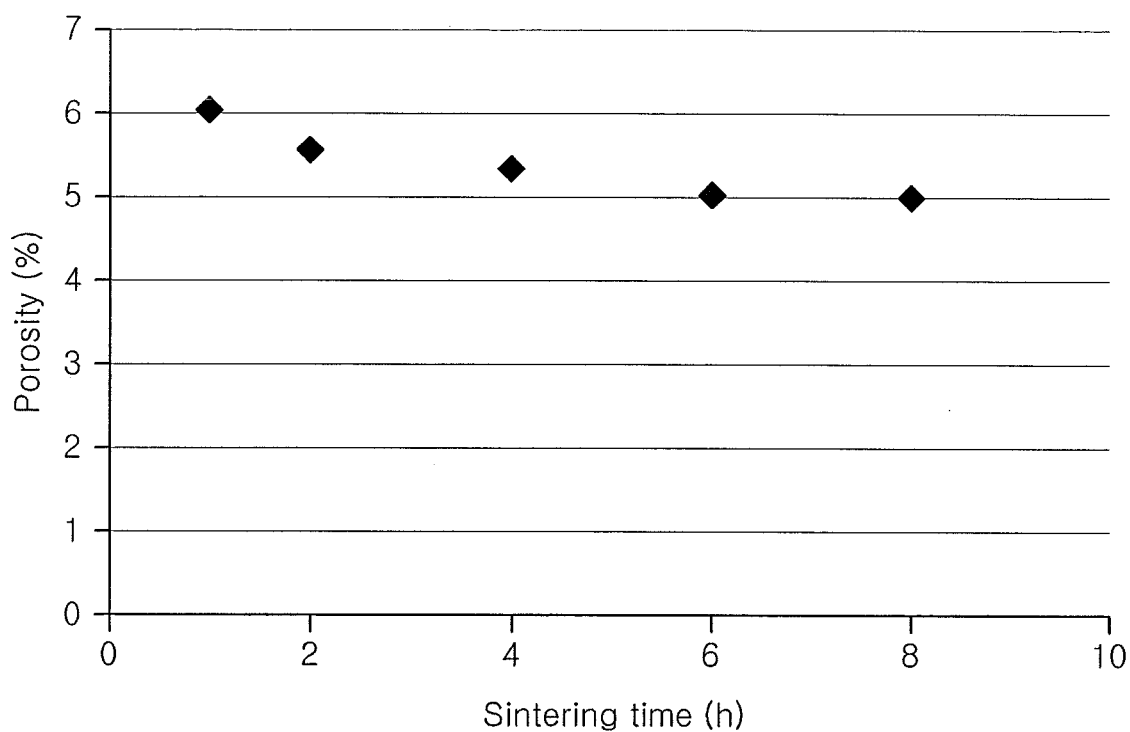
FIG. 7 is a graph illustrating variations in porosity depending on sintering time at a sintering temperature of about 1000° C. when using the powder of Example 5 (composite powder including samarium-doped ceria mixed with bismuth oxide; bismuth oxide content: about 20 wt % based on the total weight of the composite powder). Herein X-axis represents sintering time (h) and Y-axis represents porosity (%)

FIG. 7 is a graph illustrating variations in porosity at a sintering temperature of about 1000° C. when using the powder of Example 5 (composite powder including samarium-doped ceria mixed with bismuth oxide; bismuth oxide content: about 20 wt % based on the total weight of powder). In FIG. 7, X-axis represents sintering time (h) and Y-axis represents porosity (%).

As shown in FIG. 7, sintering density decreases slightly with time after sintering time of about 30 minutes or more, but shows no significant change.

EXPERIMENT 6

In this Experiment, movement of a doping metal is studied.

Figure 8:
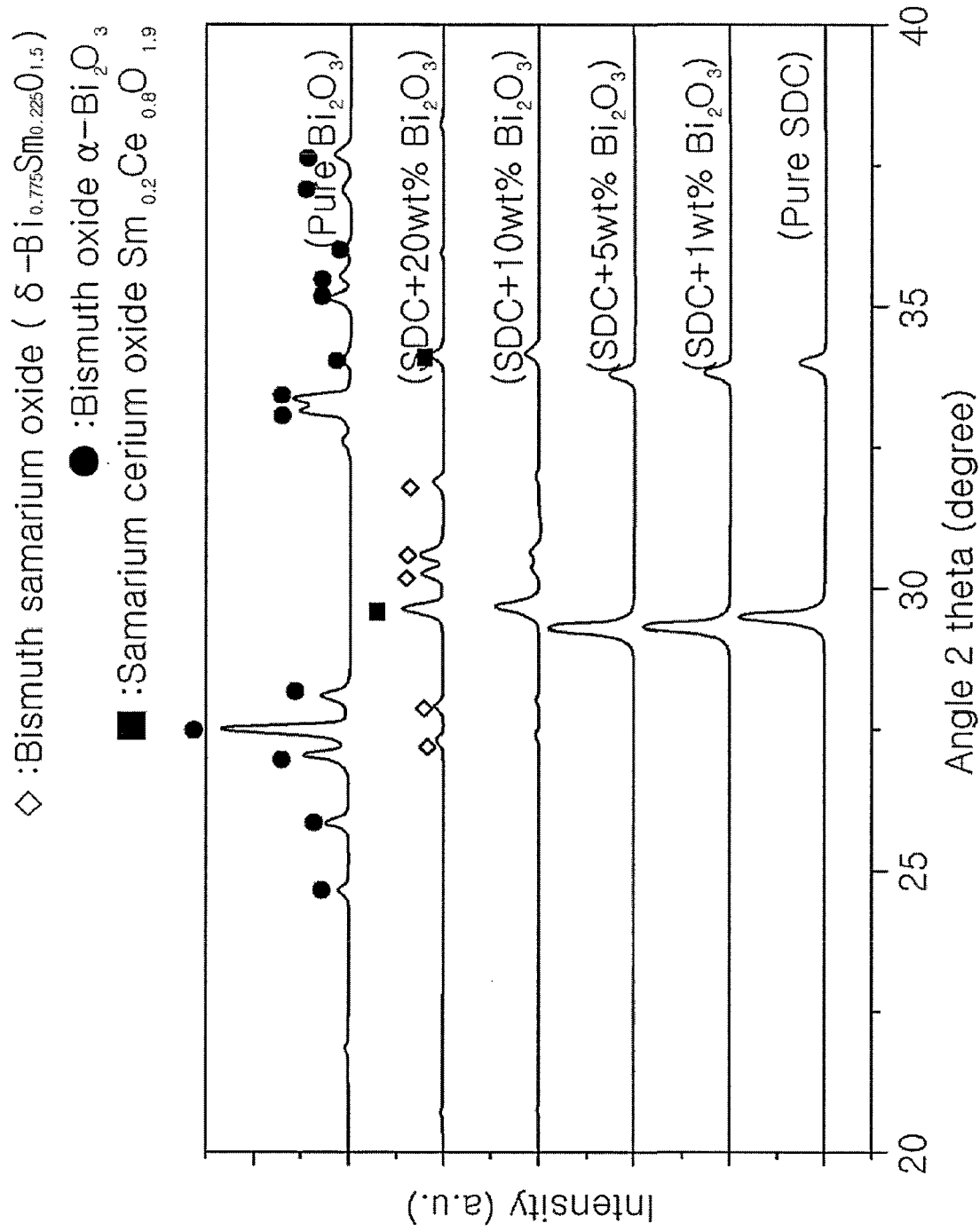
FIG. 8 shows the X-ray diffractometry (XRD) pattern of the sintered body (sintered at about 1000° C. for about 2 hours) depending on bismuth oxide content according to an embodiment.

FIG. 8 shows the X-ray diffractometry (XRD) pattern of the sintered body (sintered at 1000° C. for 2 hours) depending on bismuth oxide content according to an embodiment.

In FIG. 8, referring to Comparative Examples 2 and 3, there is a shift of peaks toward a smaller 2 theta ($\theta$). It is believed that this may result from movement of bismuth atoms having a larger radius than that of cerium toward samarium-doped ceria. In addition, it is reported that less than about 1% of bismuth is incorporated into samarium-doped ceria (Solid State Ionics 178, 359-365, 2007). However, in the sample of Example 5 sintered at about 1000° C., it can be seen that another phase different from Comparative Example 1 and pure bismuth oxide exists. The peak corresponding to the phase is the same as the peak of $Bi_{0.775}Sm_{0.225}O_{1.5}$. Further, in Example 5, addition of about 20% of bismuth oxide causes a shift of the main peak of samarium-doped ceria toward a larger 2 theta ($\theta$) as compared to the peaks in Comparative Example 2 and Comparative Example 3 doped with about 1% and about 5% of bismuth oxide, respectively. This is because samarium having a larger atomic radius than that of cerium moves toward bismuth oxide, thereby resulting in a decrease of lattice parameters.

Figure 9A:
FIG. 9a shows a Transmission Electron Microscopic (TEM) image of showing grain boundaries of the sintered body.
Figure 9B:
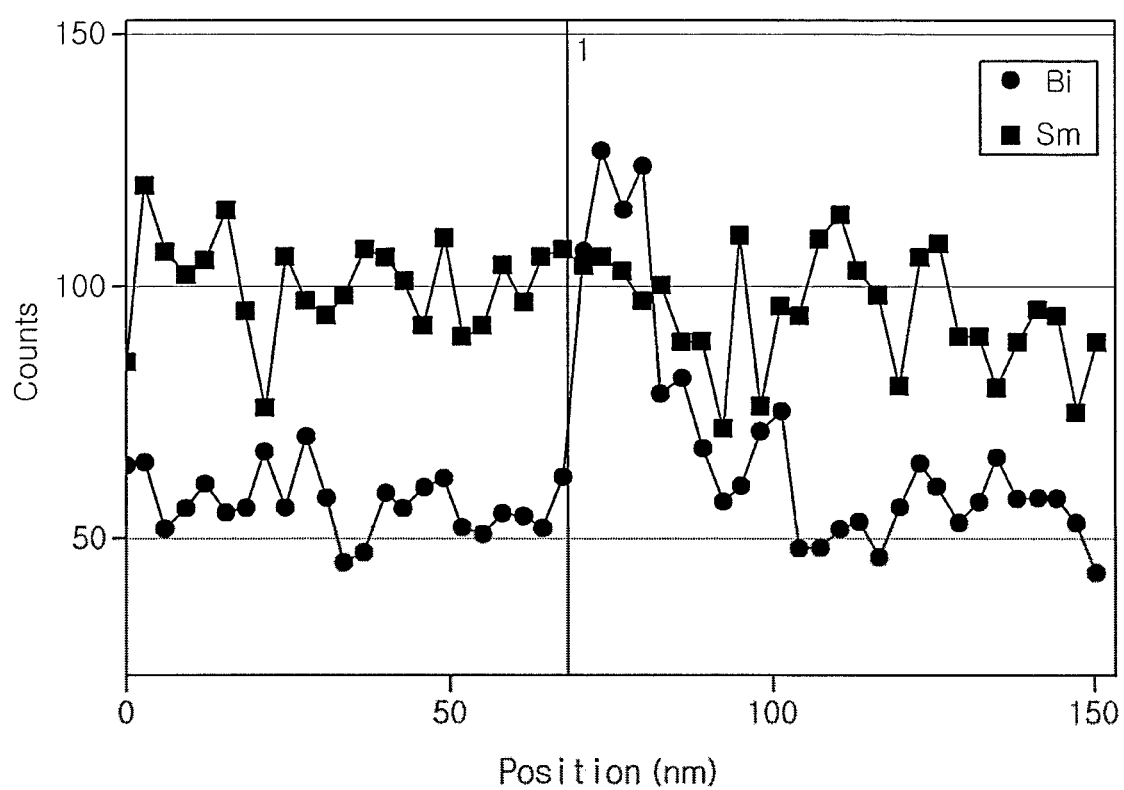
FIG. 9b shows the results of line profile compositional analysis demonstrating the grain boundaries of the sintered body (sintered at about 1000° C. for about 2 hours) of Example 5 using Transmission Electron Microscopy-Energy Dispersive Spectroscopy (TEM-EDS)

These results are also supported by the results of Transmission Electron Microscopy-Energy Dispersive Spectroscopy (TEM-EDS) analysis as shown in FIG. 9b which shows the results of line profile compositional analysis demonstrating the grain boundaries of the sintered body as shown in FIG. 9a (sintered at about 1000° C. for about 2 hours) of Example 5 using TEM-EDS. As can be seen from FIGS. 9a and 9b, the line profile results obtained at the grain boundaries show that a high bismuth peak exists at the grain boundaries and samarium (Sm) elements exists evenly in the grain boundaries and grains.

Figure 10:
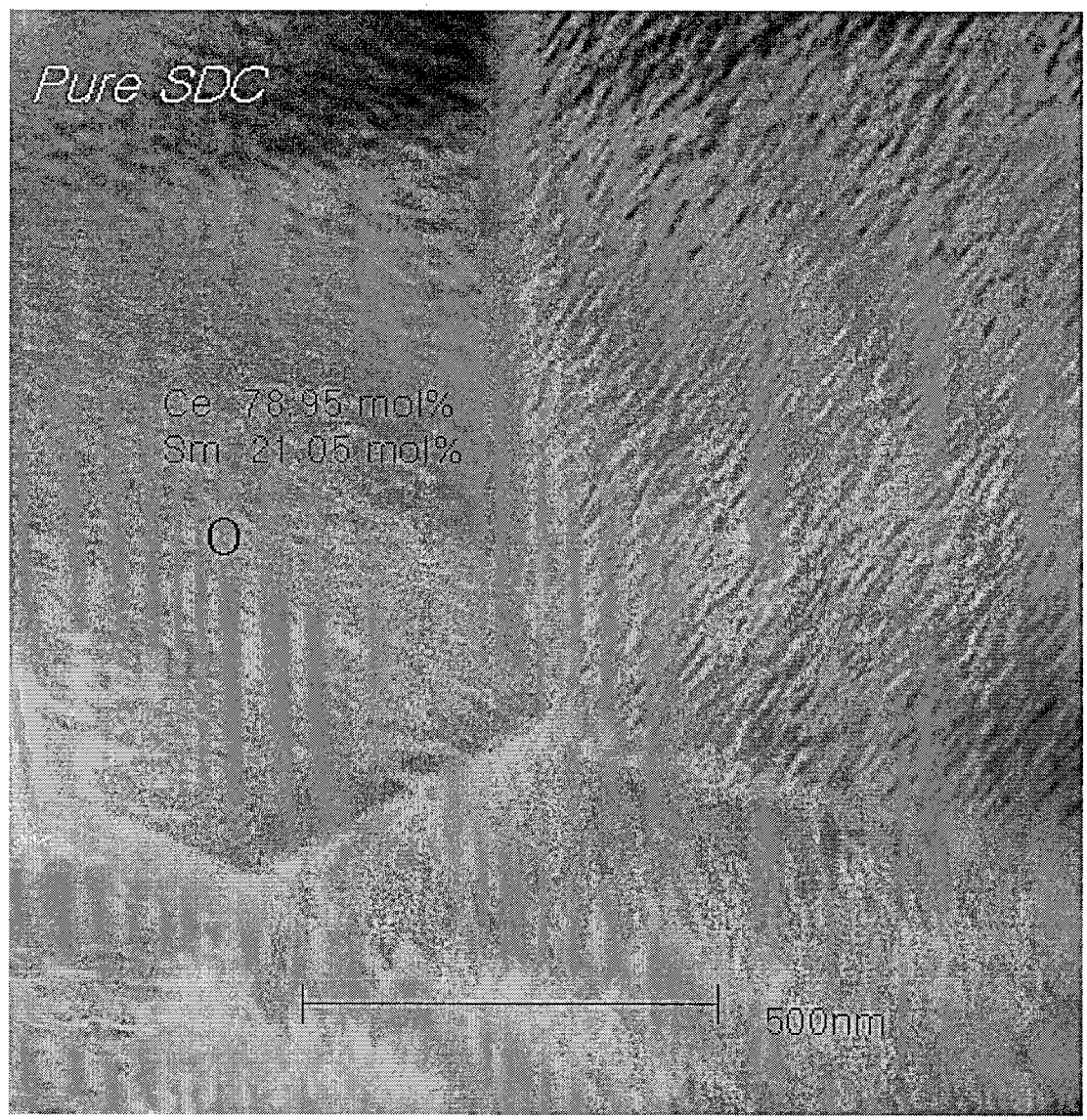
FIG. 10 shows the results of TEM-EDS analysis of the grains of the sintered body (sintered at about 1500° C. for about 2 hours) of Comparative Example 1.
Figure 11:
FIG. 11 shows the results of TEM-EDS analysis of the grains of the sintered body (sintered at about 1000° C. for about 2 hours) of Example 5.

FIG. 10 shows the results of TEM-EDS analysis of the grains of the sintered body (sintered at about 1500° C.) of Comparative Example 1 (samarium-doped ceria alone), and FIG. 11 shows the results of TEM-EDS analysis of the grains of the sintered body (sintered at about 1000° C.) of Example 5 (composite powder including samarium-doped ceria mixed with bismuth oxide; bismuth oxide content: about 20 wt % based on the total weight of powder). As can be seen from FIG. 10 and FIG. 11, in the case of Example 5 sintered at about 1000° C., about 1% of bismuth is present in the grains and samarium element content slightly decreases from about 21% to about 15%. As also explained in the XRD results above, this TEM-EDS analysis demonstrates that samarium (Sm) elements in SDC (samarium-doped ceria) move toward bismuth oxide and bismuth oxide is stabilized as a material having high ion conductivity.

EXPERIMENT 7

Figure 12A:
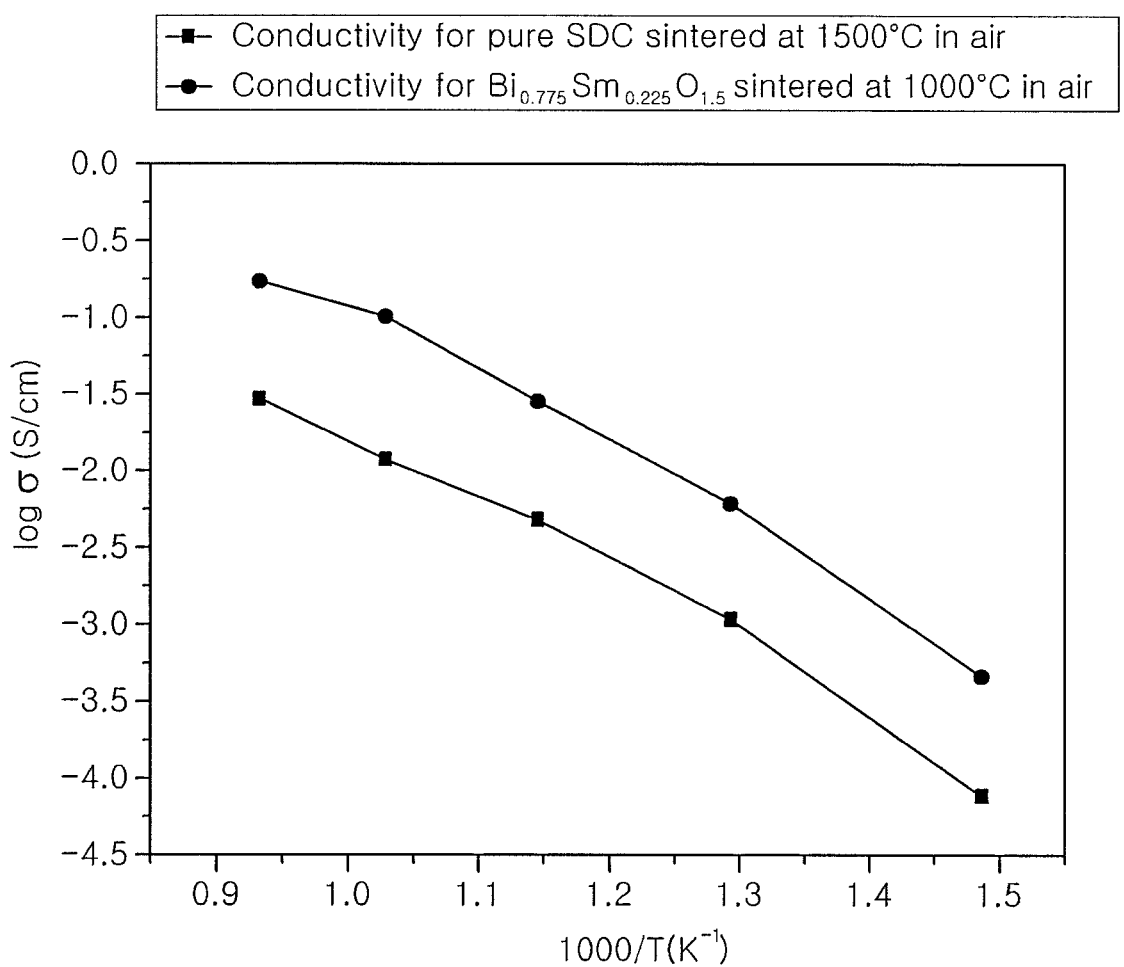
FIG. 12a and FIG. 12b are graphs illustrating the electroconductivity (FIG. 12a) of $Bi_{0.775}Sm_{0.225}O_{1.5}$ and the XRD pattern (FIG. 12b) thereof according to Experiment 7.
Figure 12B:
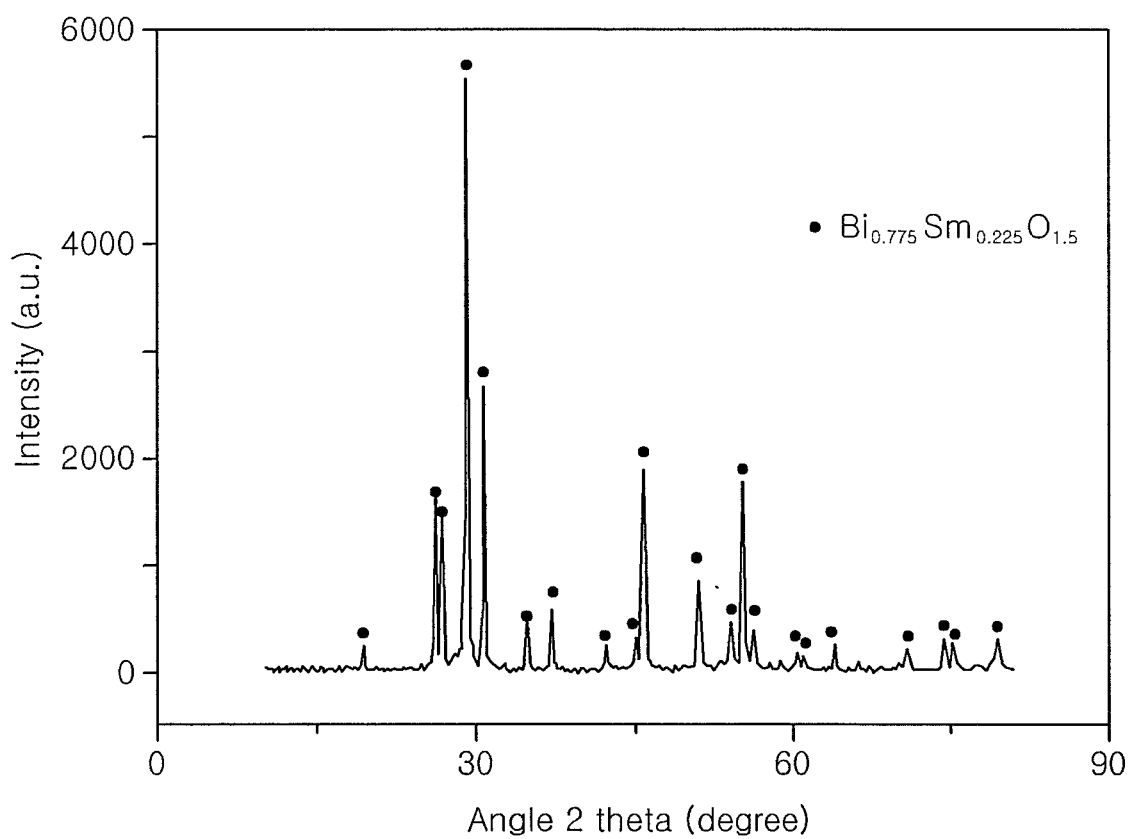

As can be seen from Experiment 6, it is believed that samarium elements in SDC (samarium-doped ceria) move toward bismuth oxide and form $Bi_{0.775}Sm_{0.225}O_{1.5}$, which result in an increase of ion conductivity. To verify this, $Bi_{0.775}Sm_{0.225}O_{1.5}$ is prepared and electroconductivity thereof is measured. FIG. 12a and FIG. 12b are graphs illustrating the electroconductivity (FIG. 12a) of $Bi_{0.775}Sm_{0.225}O_{1.5}$ and the XRD pattern (FIG. 12b) thereof according to Experiment 7. As can be seen from FIG. 12a and FIG. 12b, $Bi_{0.775}Sm_{0.225}O_{1.5}$ shows higher electroconductivity as compared to samarium-doped ceria.

Meanwhile, it can be expected that mixing samarium-doped ceria with $Bi_{0.775}Sm_{0.225}O_{1.5}$ instead of pure bismuth oxide provides higher ion conductivity. However, a phase diagram between bismuth oxide and samarium oxide ($Sm_2O_3$) suggests that a higher samarium oxide ($Sm_2O_3$) content causes an increase in melting point. Therefore, it can be also expected that although use of samarium-doped bismuth oxide improves ion conductivity, it also increases the melting point and thereby shows a limitation in reducing sintering temperature.

According to the present disclosure, unlike the conventional ceria-based electrolyte where a sintering aid agent serves as impurities, thereby resulting in degradation of ion conductivity of ceria although the ceria is a core ion conductive material, surprisingly, it is possible to reduce sintering temperature to a temperature significantly lower than the conventional sintering temperature of about 1500° C., for example, to a temperature of about 1000° C. or lower, and at the same time, to ensure a high sintering density, for example, a sintering density of about 95% by using a composition comprising a ceria and a bismuth oxide, particularly a composition comprising a metal-doped ceria and/or a metal-doped bismuth oxide, more particularly a composition comprising a metal-doped ceria and bismuth oxide according to the embodiments as described above, to induce partial movement of a doping metal toward a non-doped metal.

It is also possible to inhibit electron conductivity of ceria by causing bismuth oxide, which is an ion conductor to be formed at ceria grain boundaries, as well as to enhance ion conductivity of ceria-based composite electrolyte. As a result, the embodiments may be applicable to densification and scaling-up to large area through a low-temperature sintering process, such as low-temperature in situ sintering in fuel cells, etc. Therefore, the embodiments may be advantageous to contribute to commercialization of ceria-based electrolyte.

While the exemplary embodiments have been shown and described, it will be understood by those skilled in the art that various changes in form and details may be made thereto without departing from the spirit and scope of the present disclosure as defined by the appended claims.

What is claimed is:

1. A sintered body of a ceria-based composition, the ceria-based composition comprising an undoped ceria or a metal-doped ceria; and an undoped bismuth oxide or a metal-doped bismuth oxide,
    wherein the ceria-based composition comprises at least one selected from the group consisting of the metal-doped ceria and the metal-doped bismuth oxide; and the metal doped ceria and/or the metal-doped bismuth oxide comprises a doping metal at a concentration between 10 wt % and 30 wt % with respect to the metal-doped ceria and/or the metal-doped bismuth oxide; and
    the undoped bismuth oxide or the metal-doped bismuth oxide is present in an amount more than 10 wt % and less than 50 wt % based on the total weight of the ceria-based composition, and
    the doping metal is at least one selected from the group consisting of samarium, gadolinium, lanthanum, zirconium, yttrium, ytterbium, erbium, praseodymium, neodymium, and combinations thereof,
    wherein the sintered body comprises ceria grains and bismuth oxide present at grain boundaries surrounding the ceria grains, wherein the doping metal is present in the grains and the grain boundaries.

2. The sintered body according to claim 1, wherein the bismuth oxide or the metal-doped bismuth oxide is present in an amount of 10 wt % to 30 wt % based on the total weight of the ceria-based composition.

3. The sintered body according to claim 1, wherein the bismuth oxide or the metal-doped bismuth oxide is present in an amount more than 15 wt % and equal to or less than 25 wt % based on the total weight of the ceria-based composition.

4. The sintered body according to claim 1, wherein the bismuth oxide or the metal-doped bismuth oxide is present in an amount of 20 wt % to 25 wt % based on the total weight of the ceria-based composition.

5. The sintered body according to claim 1, wherein the ceria-based composition consists essentially of the metal-doped ceria and the undoped bismuth oxide.

6. The sintered body according to claim 5, wherein the ceria-based composition consists essentially of a samarium-doped ceria and the undoped bismuth oxide.

7. The sintered body according to claim 6, wherein the samarium-doped ceria is $Sm_{0.2}Ce_{0.6}O_2$.

8. The sintered body according to claim wherein the doping metal is at least one selected from the group consisting of lanthanum, zirconium, yttrium, ytterbium, erbium, praseodymium, neodymium, and combinations thereof.

9. A method of preparing a sintered body, the method comprising:
    mixing together an undoped ceria or a metal-doped ceria; and an undoped bismuth oxide or a metal-doped bismuth oxide; to form a ceria-bismuth powder,
        wherein the ceria-bismuth powder comprises at least one selected from the group consisting of the metal-doped ceria and the metal-doped bismuth oxide,
        wherein the metal-doped ceria and/or the metal-doped bismuth oxide comprises a doping metal at a concentration between about 10 wt % and about 30 wt % with respect to the metal-doped ceria and/or the metal-doped bismuth oxide,
        wherein the undoped bismuth oxide or the metal-doped bismuth oxide is present in an amount more than 10 wt % and less than 50 wt % based on the total weight of the ceria-bismuth powder,
        wherein the doping metal is selected from the group consisting of samarium, gadolinium, lanthanum, zirconium, yttrium, ytterbium, erbium, praseodymium, neodymium, and combinations thereof; and
    sintering the mixed together ceria-bismuth powder at temperatures between about 800° C. to about 1000° C. to form the sintered body,
    wherein the sintered body comprises ceria grains and bismuth oxide present at grain boundaries surrounding the ceria grains, wherein the doping metal is present in the grains and the grain boundaries.

10. The method according to claim 9, wherein the method further comprises:
    molding an anode powder into an anode support wherein the anode powder comprises a metal powder mixed with an amount of the ceria-bismuth powder;
    coating the anode support with an electrolyte slurry made from the ceria-bismuth powder to coat the anode support with an electrolyte coat;
    layering a cathode slurry onto the electrolyte coated on the anode support; and
    sintering in-situ the anode support coated with the electrolyte coat and layered with the cathode slurry at temperatures between about 800° C. to about 1000° C.

11. The method according to claim 9, further comprising calcining, prior to sintering, the ceria-bismuth powder between about 300° C. to about 800° C.

12. The method according to claim 9, wherein the ceria-bismuth powder consists essentially of the metal-doped ceria and the undoped bismuth oxide.

13. The method according to claim 9, wherein the ceria-bismuth powder consists essentially of $Sm_{0.2}Ce_{0.8}O_2$ and $Bi_2O_3$, and the sintered body comprises $Bi_{0.775}Sm_{0.225}O_{1.5}$.

14. The method according to claim 9, wherein the ceria-bismuth powder is charged to a fuel cell without sintering, and then is sintered in-situ during an operation of the fuel cell.

* * * * *